United States Patent [19]
Viracola

[11] B 3,914,733
[45] Oct. 21, 1975

[54] SYSTEM INCLUDING A PRESSURE SWITCH FOR COUNTING AXLES AND CLASSIFYING VEHICLES

[76] Inventor: Joseph R. Viracola, P.O. Box 2, Santa Monica, Calif. 90403

[22] Filed: Apr. 16, 1973

[21] Appl. No.: 351,421

[44] Published under the Trial Voluntary Protest Program on January 28, 1975 as document no. B 351,421.

[52] U.S. Cl. .............................. 340/38 R; 340/272
[51] Int. Cl.² ....................................... G08G 1/015
[58] Field of Search .......... 340/22, 31 R, 38 R, 240, 340/272; 200/81 R, 81 H, 82 R, 83 C, 83 Z, 81.4, 86 R, 86 A, DIG. 35, DIG. 37

[56] References Cited
UNITED STATES PATENTS

| | | | |
|---|---|---|---|
| 1,836,655 | 12/1931 | Dunford | 200/86 A |
| 2,403,277 | 7/1946 | Hall | 200/86 A |
| 2,608,609 | 8/1952 | Fitch | 200/81 R |
| 2,639,093 | 5/1953 | Hall | 200/81 R |
| 3,105,952 | 10/1963 | Kidder | 340/38 R |
| 3,116,382 | 12/1963 | Loomis et al. | 200/81 H |
| 3,699,398 | 10/1972 | Newmeyer | 340/272 |

*Primary Examiner*—Kathleen H. Claffy
*Assistant Examiner*—Randall P. Myers
*Attorney, Agent, or Firm*—Ralph B. Pastoriza

[57] ABSTRACT

The system includes a pressure switch connected to a hose intercepting vehicle tires on a highway lane and includes a bellows which will expand a first given distance when a single tire axle passes over the hose and a second given distance when a dual tire axle passes over the hose, the second given distance being greater than the first given distance because of the increased volume of air provided by the dual tire axles. A first switch means is held open by a stem movable with the bellows and will be released to close when the bellows and stem move through the first given distance. A second switch in turn is normally opened but will be positively closed when the bellows and stem move through the second given distance. First and second electrical signals are provided on first and second lines connected to the first and second switches respectively for feeding into a computer which will count and classify the signals.

10 Claims, 3 Drawing Figures

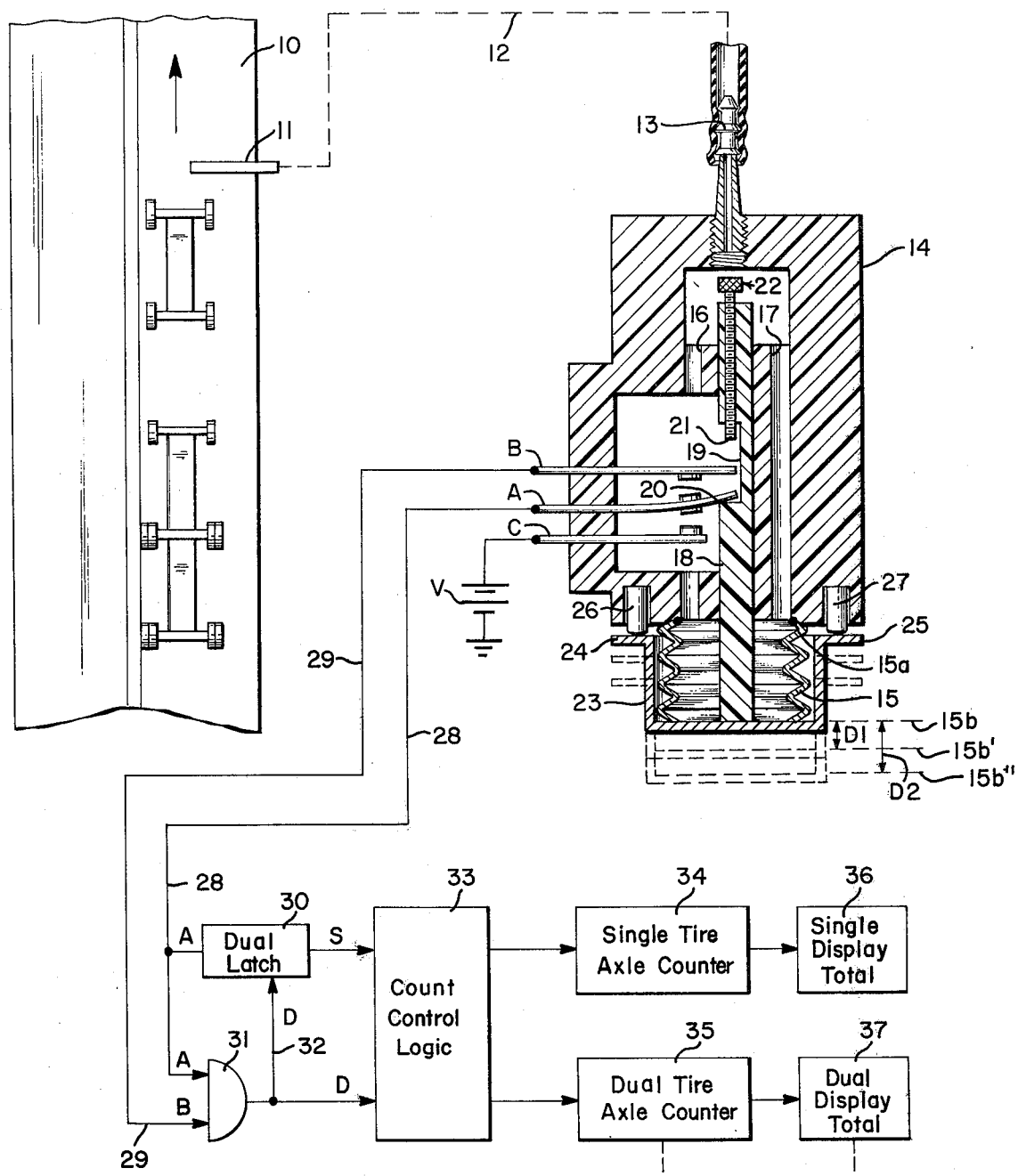

SYSTEM INCLUDING A PRESSURE SWITCH FOR COUNTING AXLES AND CLASSIFYING VEHICLES

This invention relates generally to air pressure switches for counting and classifying vehicles traveling along a highway and more particularly to an improved pressure switch structure for providing first and second output electrical signals resulting when a single tire axle and a dual tire axle pass over the switch hose respectively.

BACKGROUND OF THE INVENTION

Counting vehicle axles along a given section of highway by means of an air hose over which the vehicle tires run and cooperating pressure responsive switch connected to the air hose is a well known art. Most prior art switching systems, however, rely on a pulse of air provided in the air hose to cause closure of a switch which in turn provides an electrical signal for feeding into a counter. A major mechanical problem with the systems in the generation of spurious air pulses in the hose which can cause the mechanical switch arm when driven closed to "chatter" and thereby give rise to spurious signals. This result is a direct consequence of utilizing a pulse of air to "push" a switch closed.

In addition to the foregoing, it would be very helpful when counting vehicle axles if the types of vehicles traveling along the highway could be classified. For example, it would be desirable to know not only the total number of vehicle axles traveling along the highway but the types of vehicles involved; for example, cars or trucks according to their axle arrangements.

BRIEF DESCRIPTION OF THE PRESENT INVENTION

With the foregoing in mind, the present invention contemplates an improved method and pressure switch not only useful for counting vehicle axles but for also classifying the vehicles. In this respect, the classification is based on the total width of tires on one end of the vehicle axle. Accordingly, if the air pressure hose over which the vehicle tires run is positioned to intercept one half of a roadway or highway vehicle lane, in the case of an automobile, only one of the tires on each axle runs over the hose whereas in the case of a truck employing dual tires on each end of the axle, only two tires run over the hose simultaneously.

For convenience in describing the present invention, any vehicle having only a single tire on each end of an axle such as an automobile will be referred to as a "single tire axle" whereas any vehicle which has dual tires on each end of an axle such as is normally the case with large trucks will be referred to as a "dual tire axle". The invention thus contemplates counting axles and classifying vehicles having single tire axles and dual tire axles, a single tire axle running over the air hose generating a first air pulse of given volume and a dual tire axle running over the air hose generating a second air pulse of greater volume than the first given volume because of their greater tire width.

An air chamber means connected to the air hose includes an element movable through first and second positions in response respectively to the first and second air pulses. First and second switch means in turn are coupled to the element for actuation thereby to provide first and second electrical signals. The first switch means is held in an open position by the element in the absence of any air pulses and released by the element to close when the element passes through the first position. By utilizing a normally closed type of switch which is held open by the element and thence released in response to a pulse of air, the problems of "chattering" or generation of spurious air pulses will not affect the switch, once the element having been moved out of the way, the switch assuming its normally closed position.

The second switch is normally opened and closed by the element only when the element reaches its second position in response to the larger volume air pulse from a dual tire axle.

The assembly is completed by the provision of computer means connected to the first and second switch means to count and display combinations of the first and second electrical signals provided when the switch means are actuated.

BRIEF DESCRIPTION OF THE DRAWINGS

The foregoing as well as further features and advantages of the present invention will be better understood by now referring to a preferred embodiment of the pressure switch as shown in the attached drawings in which:

FIG. 1 is an elevational cross section of the basic switch housing showing schematically its connection to a pressure air hose and also illustrating in block form a computer for classifying vehicles in response to signals provided by the switch housing;

FIG. 2 is a simple "truth" table illustrating the manner in which first and second electrical signals corresponding to single or dual tire axles are generated by the switches in the housing of FIG. 1; and, FIG. 3 is a classification table useful in explaining the operation of the invention;

DETAILED DESCRIPTION OF THE INVENTION

Referring first to FIG. 1 there is shown a roadway or highway single lane 10 wherein a hose 11 has been positioned to intercept one half of the lane 10 so that one tire of each axle of an automobile, for example, running over the hose will generate a first air pulse of given volume in the hose 11. Continuing with the example depicted in FIG. 1, if next a truck should follow the automobile, there will be generated a first air pulse of given volume for the front single tire portion of the truck axle and subsequently a second air pulse of greater volume than the referred to given volume when the dual or double tires on one portion of the truck axle passes over the hose 11. This increased volume is approximately double the given volume simply as a consequence of two tires passing over the hose simultaneously.

As shown, the air hose 11 is connected as indicated by the dashed line 12 to an air nipple inlet 13 of a pressure switch housing 14. At the lower end of the housing 14 there is provided an air chamber means in the form of an expandable bellows 15 communicating with the air inlet nipple 13 as by internal passages 16 and 17.

The upper end of the bellows is secured to the housing itself as at 15a. The lower end constitutes a free end 15b which is movable away from and towards the housing in response to air pressure pulses. The volume of air in each pulse will determine the distance of travel of the free and 15b of the bellows.

A switch actuating stem 18 is reciprocably mounted in the housing for up and down movement as viewed in FIG. 1 and has one end secured to the free end 15b of the bellows as shown. It will be evident, accordingly, that the stem 18 will assume different longitudinal positions depending upon the movement of the free end of the bellows.

The central portion off the stem 18 includes a cut-out 19 defining first and second longitudinally spaced engaging means in the form of shoulders 20 and 21. The second engaging means 21 actually forms the end of a longitudinal screw 22 which may be threadedly adjustable within the stem 18 to thereby adjust the vertical position or spacing between the second engaging means 21 and the shoulder 20.

A first resilient switch arm designated A is cantilevered to the housing wall and extends into the housing in a direction normal to the stem 18 as shown. The free end of this arm includes upper and lower contacts and terminates in a position such that it is engaged and biased upwardly by the first engaging means or shoulder 20 on the stem when the free end 15b of the bellows is in a retracted position close to the housing as shown in solid lines.

A common resilient switch arm C is cantilevered to the housing wall to extend into the housing below the first arm A in a direction normal to the stem 18 in generally parallel spaced relationship to the first arm. The free end of this common resilient arm terminates short of the stem in a contact position to be engaged by the lower contact of the first arm A when the free end of the bellows 15b extends a first given distance D1 from the housing as indicated by dashed lines at 15b'.

A second resilient switch arm B also cantilevered to the housing wall extends into the housing above the first arm A in a direction normal to the stem in generally parallel spaced relationship to the first arm. The free end of the second switch arm B includes contact and terminates in a position such that it is engaged and biased downwardly by the second engaging means or end 21 of the screw 22 when the free end 15b of the bellows extends a second given distance D2 from the housing greater than the first given distance D1 as shown by the dashed lines 15b''. When the end of the bellows and stem moves through this distance, the contact on the end of the second resilient arm B engages the upper contact on the first resilient arm and thereby makes electrical connection to both the first arm A and the contact on the common resilient arm C.

The lower free end 15b of the bellows itself is secured to a metallic or magnetically responsive cup shaped member 23 having upper flanges 24 and 25 arranged to be attracted to permanent magnets 26 and 27 carried in the lower end of the housing 14. With this arrangement, the bellows is contracted or retracted back to an initial starting position which is consistently spaced from the housing and which will always be assumed by the bellows in the absence of air pulses. In such position as shown in solid lines in FIG. 1, it will be evident that the switch arm A is open or out of engagement with the contact on the common arm C. Further, the second resilient switch arm B has its contact out of engagement with any of the other contacts.

First and second electrical lines 28 and 29 connect to the switch arms A and B respectively as shown. If an electrical source such as a battery V is connected between the common arm C and ground as shown, it will be evident that a first electrical pulse will be generated on the first output signal line in response to closing of the lower contact on the first resilient switch arm A with the contact on the common resilient arm C. Further, a second electrical output signal will be provided on the second output signal line 29 in response to closing of the contact on the second resilient switch arm B with the upper contact on the first resilient switch arm and the contact on the common resilient switch arm C.

Referring to the lower block diagram of FIG. 1, there is shown a computer connected to receive signals appearing on the first and second output signal lines 28 and 29. This computer, by way of example, may include a dual latch mechanism 30 receiving the signal on line 28 from resilient switch A and a coincidence circuit 31 receiving pulses which appear both on line 28 and 29 from the resilient switch arms A and B. The coincidence circuit 31 is such that it will only pass an output signal when there appears both on the lines 28 and 29 simultaneously a signal.

The only time a signal will appear from both the switches A and B is when both are closed against the common resilient switch arm C and thus there is indicated at D an output signal from the circuit 31 indicating that both inputs have been simultaneously energized. This same output signal D passes through branch lead 32 to the dual latch mechanism 30. In addition, the output signal D representing a dual tire axle passes also to a count control logic circuit 33.

Similarly, when there is only one signal on the first output signal line 28 as occurs when only the resilient switch arm A is closed, this signal will be received in the dual latch mechanism 30 and passed to the count control logic 33 as indicated by the letter S. The dual latch mechanism 30 is responsive to the presence of a D signal on the line 32 immediately following an S signal to block further signals on the input A from the first signal line 28 passing to the count control logic 33 where such signals are a part of a dual axle signal represented by signals on both lines 28 and 29 simultaneously. In otherwords, if a count is to be made of single tire axles and distinguished from dual tire axles, the portion of the signal utilized in providing the dual tire axle signal must be blocked from being counted as a single tire axle signal.

The count control logic circuit 33 provides proper output electrical pulses to a single tire axle counter 34 and a dual tire axle counter 35, the total counts of each of these units being exhibited, if desired, by the display means designated 36 and 37 respectively connected to the outputs of the counters 34 and 35.

Referring now to FIG. 2, there is shown a "truth" table which will indicate the electrical signals appearing on the lines 28 and 29 depending upon the action of the resilient switch arms A and B. In this table, 0 corresponds to an open position for a switch and 1 corresponds to a closed position. The letter S indicates a single tire axle and the letter D indicates a dual tire axle.

As shown in the table, when both switches are open as indicated by 0, 0 there is no output as indicated also by 0,0 on the same horizontal.

When switch arm A is closed as indicated by 1 and switch arm B is still open as indicated by 0, there will be a signal S on the output as indicated by 1 and no signal D as indicated by 0.

When both switches A and B are closed as indicated in the third line by 1, 1 the output because of the action of the dual latch 30 will be O for the S signal and 1 for the D signal.

Referring now to FIG. 3, the various combinations of the signals S and D which will enable classification of various types of vehicles is shown by the table having two columns, one representing the signals maneuvered within the count control logic circuit 33 and the other column designating the corresponding vehicle classification.

In FIG. 1 it is to be understood that there will be provided a number of axle counters and display means corresponding to the different number of classifications. Thus while in FIG. 1 there is shown only two classifications, that of a single tire axle counter and that of a dual tire axle counter, there can be provided further counters and further displays corresponding to other classifications as set forth in FIG. 3.

In the specific example set forth in FIG. 3, when the signal constitutes S—S indicating a closing of the resilient switch arm A twice in a given time sequence, there will be passed to the single tire axle counter 34 a count pulse indicating one car or a motorcycle. If there are received within the time interval 3 signals S-S-S, there will be registered one and one half counts in the single tire axle counter corresponding to one and one half cars. In otherwords, in totalizing the number of cars or automobiles, a car pulling a one axle trailer is classified as one and one half cars.

In the same manner, a sequence of S-S-S-S would be classified as a car pulling a two single tire axle trailer and this would be equivalent to two cars.

Following down the table of FIG. 3 to the next signal, there is shown S-D, (S- ). This signal is passed to a dual tire axle counter for counting trucks with one dual tire axle, the front single tire axle of the truck accounting for the initial S signal. The S- signal in parenthesis indicates the leading single axle on the following vehicle and this signal is utilized to separate out trucks with one dual tire axle from those with two or more dual tire axles. These latter truck classifications are shown in the remaining portion of the classification schedule of FIG. 3 and are self explanatory.

There are several different manners in which single tire axle signals and dual tire axle signals may be combined to effect desired classifications. Actually, the particular classifications involved do not constitute part of the present invention but rather the improved pressure switch itself providing first and second output signals on first and second lines where one output signal corresponds to a single tire axle and the second output signal corresponds to a dual tire axle.

OPERATION

In operation of the pressure switch described in FIG. 1 for providing first and second signals on first and second lines corresponding respectively to single and dual tire axles, the switch arms A, B and C are normally in the position illustrated in the absence of any air pressure pulses on the hose connected to the housing 14. In this position, the bellows end 15b is fully retracted to the solid line position shown so that the stem 18 is longitudinally in a position to hold the resilient switch arm A out of contact with the common switch arm C, the second resilient switch arm B being positioned between the first and second engaging means 20 and 21 without contact with either of these portions of the stem.

The spacing between the switch contacts for the arms A and C and the spacing between the engaging shoulder 20 and the lower end 21 of the screw 22 is so adjusted that in response to a single tire axle passing over the hose 11, the volume of air generated in the air pulse will cause the lower end 15b of the bellows to move a distance at least as great as D1 and less than the distance D2. Thus whenever a single tire axle passes over the hose 11, only the switch arm A will close on the common switch arm C to provide a first electrical signal on the first output signal line 28.

However, when a dual tire axle passes over the hose 11, the simultaneous depression of the hose tires results in an air pulse of a sufficiently greater volume as to move the end 15b of the bellows 15 at least as far as the second position D2 indicated at 15b''. Under these circumstances, the second engaging means in the form of the end of the screw 21 will positively engage the second resilient switch arm B and close it on the upper contact of switch arm A and since this switch arm A is also in contact with the common switch arm C, the upper switch arm B will electrically be connected to the common resilient arm C so that a signal is then provided on the second output signal line 29.

The separation of a single tire axle signal on a line 28 from a dual tire axle signal resulting when signals appear simultaneously on the lines 28 and 29 by the coincidence circuit 31 and dual latch mechanism 30 has already been described.

A very important feature of this invention resides in the physical arrangement whereby the switch arm A is held out of engagement with the common switch arm C and is subsequently permitted or released to close to its normally closed position by movement of the engaging means 20 away from the switch arm as a consequence of the air pulse. This feature avoids any intermittent contacting of the switch arms A and C should there be small following spurious pulses since once the stem is drawn away from the resilient switch arm small oscillatory motions will not affect the closed position.

While magnetics means for holding the bellows in a consistent retracted position in the absence of pulses has been shown other means may be used such as a return spring or in the case of a metal bellows, the inherent spring characteristic of the bellows itself.

Further, the hose may extend all the way across the traffic lane if desired in which event the volume of air in each pulse would be doubled. In this case, the design of the stem 18 and/or volume of the bellows would be adjusted so that the distances D1 and D2 would be appropriate to close the switches as described heretofore.

It will thus be seen that the present invention has provided a greatly improved pressure switch device which will not only count but will also serve to classify vehicles traveling along a highway.

What is claimed:

1. A system including a pressure switch for classifying vehicles having single tire axles and dual tire axles comprising, in combination:
   a. hose means positioned to intercept a roadway vehicle lane so that one tire of each axle of a single tire axle running over the hose generates a first air pulse of given volume and so that dual tires of each axle of a dual tire axle running over the hose generates a second air pulse of greater volume than said given volume;

b. air chamber means connected to the hose and including an element movable through first and second positions in response respectively to said first and second air pulses;

c. first and second switch means coupled to said element for actuation thereby to provide first and second electrical signals, said first switch means being held in an open position by said element in the absence of any air pulses and released by said element to close when said element passes through said first position, said second switch being normally open and closed by said element only when said element reaches said second position; and;

d. computer means connected to said first and second switch means to count and display combinations of said first and second electrical signals respectively.

2. A system including a pressure switch for classifying vehicles by providing a first output signal on a first line in response to a single tire axle and a second output signal on a second line in response to a dual tire axle, said system including, in combination:

a. an expandable air chamber means for connection to a hose over which vehicle tires run, said chamber expanding from a normally contracted position to a first distance in response to a pulse of air generated by a single tire axle running over said hose and expanding to a second distance greater than said first distance in response to a pulse of air generated by a dual tire axle running over said hose;

b. a first switch means connected to said first line and coupled to said air chamber means and held in an open position by said air chamber means when in said contracted position, said first switch means being released by said air chamber means to close when said air chamber means expands to said first distance to provide said first output signal; and, c. a second switch means connected to said second line and coupled to said air chamber means, said second switch means being normally opened, said air chamber means positively closing said second switch means when it expands to said second distance to provide said second output signal.

3. A system according to claim 2, in which said expandable air chamber means comprises a housing supporting a bellows having a free end movable from said housing through said first and second distances; and a switch actuating stem means reciprocably slidable in said housing connected to said free end of said bellows for movement therewith, said first and second switch means being actuated by movement of said stem through said first and second distances respectively.

4. A system according to claim 3, in which said housing includes means for holding said free end of said bellows in a consistent contracted position in the absence of pulses of air.

5. A system including a pressure switch for classifying vehicles by providing a first output signal on a first line in response to a single tire axle and a second output signal on a second line in response to a dual tire axle, said system comprising, in combination:

a. a switch housing having an air input opening for connection to a hose over which vehicle tires run;

b. an air bellows secured to the housing with its interior in communication with said inlet opening and its free end movable away from and towards the housing in response to air pressure pulses, the volume of air in each pulse determining the distance of travel of said free end;

c. a switch actuating stem reciprocably mounted in said housing with one end secured to said free end of the bellows so that said stem assumes different longitudinal positions depending upon the movement of said free end of said bellows, said stem including in its central portion first and second longitudinally spaced engaging means;

d. a first resilient switch arm cantilevered to extend into said housing in a direction normal to the stem, the free end of the arm including upper and lower contacts and terminating in a position such that it is engaged and biased upwardly by said first engaging means on said stem when said free end of the bellows is in a retracted position close to said housing;

e. a common resilient switch arm cantilevered to extend into said housing below said first arm in a direction normal to the stem in generally parallel spaced relationship to said first arm, its free end terminating short of the stem in a contact positioned to be engaged by the lower contact of said first arm when said free end of the bellows extends a first given distance from the housing;

f. a second resilient switch arm cantilevered to extend into said housing above said first arm in a direction normal to the stem in generally parallel spaced relationship to said first arm, its free end including a contact and terminating in a position such that it is engaged and biased downwardly by said second engaging means on said stem to contact the upper contact on said resilient arm and thereby make electrical connection to both said first arm and the contact on said common resilient arm when the free end of said bellows extends a second given distance from the housing greater than said first given distance;

g. first and second output signal lines connected respectively to said first and second resilient switch arms; and, h. means for providing an electrical output signal on said first output line in response to closing of the lower contact on said first resilient switch arm with the contact on said common resilient arm, and an electrical output signal on said second output line in response to closing of the contact on said second resilient switch arm with the upper contact on said first resilient switch arm and said contact on said common resilient switch arm, the volume of air in an air pulse generated when a single tire axle runs over the hose causing the bellows to extend a distance at least as great as said first given distance but less than said second given distance and the volume of air in an air pulse generated when a dual tire axle runs over the hose causing the bellows to extend to at least said second given distance.

6. A system according to claim 5, including a magnetic responsive member secured to and movable with the free end of said bellows, said housing including permanent magnet means adjacent to the secured end of the bellows in a position to attract and hold the magnetic member and thereby the free end of the bellows in its retracted position close to the housing in the absence of any air pulses.

7. A system according to claim 5, including computer means connected to said first and second output signal lines for receiving signals thereon and classifying various combinations of such signals to provide a count of the number of two single tire axles and the number of one single tire axle followed by one or more dual tire axles whereby a classification of different types of vehicles can be effected.

8. A system according to claim 5, in which the longitudinal positioning of said second engaging means on said stem is adjustable whereby the second given distance through which said stem must travel to close said second resilient switch arm may be adjusted.

9. A system for counting single axles including, in combination:
   a. hose means positioned on a roadway so that a tire running over the hose means generates an air pulse;
   b. air chamber means connected to the hose and including an element movable in response to said air pulse;
   c. a switch means including a resilient switch arm normally biased to close but engaged to be held open by said element in the absence of any air pulses, movement of said element in response to a pulse of air disengaging said switch arm to thereby permit it to close; and
   d. counting means connected to said switch means for counting the number of times the switch arm is closed.

10. A method of classifying vehicles having a single tire axle and dual tire axles in accordance with their axle arrangements while the vehicles are passing along a roadway, comprising the steps of:
   a. generating a first air pulse of given volume in response to passing of a single tire axle;
   b. generating a second air pulse of volume greater than said given volume in response to passing of a dual tire axle;
   c. mechanically converting said first air pulse into a first electrical signal;
   d. mechanically converting said second air pulse into a second electrical signal;
   e. detecting the first electrical signal; and detecting the simultaneous presence of the first and second electrical signals; and,
   f. counting and displaying combinations of said first and second electrical signals in a manner to provide totalized counts of two single tire axles and one single tire axle followed by one or more dual tire axles whereby vehicle types such as automobiles and various types of trucks can be distinguished and separately classified.

* * * * *